3,218,257
LUBRICATING OIL COMPOSITIONS CONTAINING N-BORNYLPHENYL-α-NAPHTHYLAMINE
Robert L. Peeler, Albany, Calif., assignor to California Research Corporation, San Francisco, Calif., a corporation of Delaware
No Drawing. Filed Mar. 28, 1963, Ser. No. 268,557
2 Claims. (Cl. 252—50)

This application is a continuation-in-part of Peeler patent application Serial No. 213,098 filed July 30, 1962, which is now abandoned.

This invention relates to lubricant compositions. More particularly, it relates to lubricants containing an N-bornylphenyl-α-naphthylamine antioxidant having superior nonsludging properties.

Prior art antioxidants such as N-phenyl-α-naphthylamines have been extensively used in lubricating oils. However, the above compound suffers from a tendency to precipitate in the form of a polymer during oxidation. The polymeric deposits are very detrimental, especially in oils and greases used in close tolerance machinery. Further, the tendency of the inhibitor to form hard nitrogen containing sludges often causes clogging of oil ports in circulating oil systems. Additionally, the antioxidant sludge, which forms a visible precipitate, gives a poor appearance to the oils.

It has now been found that N-bornylphenyl-α-naphthylamine is essentially nonsludging in lubricating oils and greases.

Thus, the present invention involves a lubricating oil or a grease containing as a nonsludging antioxidant in an amount sufficient to inhibit oxidation N-bornylphenyl-α-naphthylamine. The preferred species is N-(para-bornylphenyl)-α-naphthylamine. The other isomers are within the scope of the invention.

The compounds of the present invention are prepared by reacting α-pinene with N-phenyl-α-naphthylamine. They can also be prepared by reacting bornyl aniline with α-naphthylamine. These reactions are suitably carried out by conventional methods which are well known to those skilled in the art.

The following example is illustrative of the preparation of the additives of this invention and is not intended to limit the scope of the invention.

EXAMPLE.—PREPARATION OF BORNYLPHENYL-α-NAPHTHYLAMINE BY ALKYLATION OF N-PHENYL-α-NAPHTHYLAMINE 210 g. of N-phenyl-α-naphthylamine was placed in a 2 liter 3-neck flask equipped with a stirrer, thermometer, reflux condenser and a dropping funnel. The flask was heated to 65° C. to melt the phenyl-α-naphthylamine and 13.3 g. of anhydrous AlCl$_3$ was added. 136 g. of α-pinene were added slowly keeping the temperature below 95° C. with a water bath and constant stirring. The mixture was then heated to 150° and held at that temperature with stirring for one hour. At that point, the product was cooled to room temperature, diluted with 300 ml. benzene, washed once with 200 ml. of 3 N aqueous HCl, twice with 500 ml. portions of H$_2$O and finally twice with 500 ml. portions of 5% aqueous NaHCO$_3$. All washes were discarded. The solution was filtered through diatomaceous earth and the remaining solvent was stripped off with nitrogen on the steam plate. The product was a dark viscous liquid weighing 338 g. having a nitrogen content of 4.17% and an average molecular weight of 375.

A portion of this material was vacuum distilled to obtain a purer fraction of bornylphenyl-α-naphthylamine. The fraction boiling between 245° and 270° C. at 0.7 mm. Hg was collected. The product was a pale yellow, viscous liquid which analyzed 3.90% nitrogen with a molecular weight of 381. Theory for mono bornylphenyl-α-naphthylamine is 3.94%, molecular weight 355, indicating that the material produced was a mixture consisting essentially of mono bornylphenyl-α-naphthylamine and containing a small amount of the dibornyl-substituted compound.

As mentioned before, the compounds of the present invention are found to be superior to phenyl-α-naphthylamine, which, although an effective and widely accepted oxidation inhibitor, precipitates a yellow sludge on mild oxidation in either oil or silicate base lubricants. This precipitate occurs even in white oil, which does not contribute to the sludge itself. Infrared, ultraviolet, and elemental analyses of the precipitate shows it to be a polymer derived from the inhibitor rather than from the oil.

In the tests used to illustrate the effectiveness of the additives of this invention, the material was the distilled fraction referred to in the above example and is designated "N-bornylphenyl-α-naphthylamine" in the reported data.

A combination of an induction period in 340° F. uncatalyzed oxidator test and time to appearance of a precipitate on sunlight exposure in typical mineral oil base compositions was chosen to measure both antioxidant and nonsludging qualities of the lubricant. In the oxidation test a stirred sample of the oil is kept saturated with oxygen at a temperature of about 340° F. and the time in hours for 100 g. of oil to absorb 1000 ml. of oxygen is observed. In the sunlight exposure test the sample in conventional 4-oz. laboratory bottles are observed every 24-hour day and the time in days noted for the first appearance of cloudiness or precipitate.

The test data given below embody the above-described procedures. N-phenyl-α-naphthylamine was compared with the claimed compound. All of the compounds were employed in concentrations of 10 mM./kg. of medicinal grade white oil.

Table I

| Additive | Oxidation Life, Hours | Sunlight Life, Days |
|---|---|---|
| N-phenyl-α-naphthylamine | 4.6 | 3 |
| N-bornylphenyl-α-naphthylamine | 4.0 | 14 |

The data show oxidation life of the two compounds to be nearly the same. Sunlight life of the N-bornylphenyl-α-naphthylamines is far superior to the conventional N-phenyl-α-naphthylamine.

The following test illustrates more convincingly the new superior antioxidant. The stability of turbine oil was determined according to ASTM Standard Method D 943–54. Using this method, the test was stopped when the acid number exceeded about 2.0. The acid number was found according to ASTM Standard Method D–974. The used oil was filtered through whatman No. 2 filter paper, the precipitate washed with hexanes and dried.

The table illustrates a comparison of N-phenyl-α-naphthylamine with N-bornylphenyl-α-naphthylamine. The tests were of paraffin base oil plus 3.1% basic calcium sulfonate plus 0.5% sulfurized diparaffin sulfide plus 0.03% alkylphenol ethylene oxide reaction product plus 0.001% dimethyl silicone foam inhibitor.

*Table II*

| Inhibitor | N-phenyl-α-Naphthylamine | N-bornyl-phenyl-α-Naphthylamine | None |
|---|---|---|---|
| Amount of inhibitor, percent | 0.3 | 0.49 | -------- |
| Hours until test terminated | 1,172 | 1,172 | 336 |
| Base number (2.8 at start) | 0.86 | .84 | 0.1 |
| Insoluble material, mg | 866 | 888 | Gel |
| Percent nitrogen in insoluble material | 0.14 | 0.05 | -------- |

As illustrated above, the amount of nitrogen containing insolubles is considerably less using the improved oil composition. The oil composition containing the old N-phenyl-α-naphthyl inhibitor was roughly about three times poorer.

Ordinarily a major proportion of lubricating oil is employed in combination with a minor amount of inhibitor sufficient to inhibit oxidation. Preferably, the amount of inhibitor in oil will vary from about 0.5% to about 5.0%. The effective amount, however, can easily be determined by those skilled in the art.

The inhibitors of this invention are used with good effect in any of a wide variety of oils of lubricating viscosity or of blends of such oils. Thus the base oil can be a mineral lubricating oil of either paraffinic or naphthenic types. Synthetic lubricating oils may also be used, including alkylene oxide polymers such as the 2-ethylhexanol-initiated polymer of propylene oxide and/or ethylene oxide. Esters of carboxylic acids, such as di(2-ethylhexyl) sebacate are also suitable. Silicate esters, such as tetraoctyl silicate, hexa(2-ethylbutoxy) disiloxane and mixtures thereof may be used. If desired, the base oil can be a mixture of mineral oils and/or synthetic oils.

The inhibitors of this invention are also useful in lubricant compositions in combination with other additives such as pour point depressants, oiliness and extreme pressure agents, detergents, viscosity index improvers, soap thickening agents of the type employed in greases, as well as other conventional additives. Illustrative additives of these types include the polyalkyl methacrylate and dialkyl fumarate pour point depressant, tricresyl phosphate oiliness agent, octadecenyl amine salt of mixed mono- and didodecyl phosphate extreme pressure agent, polydodecyl methacrylate viscosity index improvers, calcium petroleum sulfonate detergents, polyglycol substituted polymeric dispersants and others.

According to the present invention, the antioxidants may be admixed with oil to form concentrates. The concentrate can be later diluted to form the finished product.

I claim:
1. A lubricating oil containing as a nonsludging antioxidant in an amount sufficient to inhibit oxidation N-bornylphenyl-α-naphthylamine.
2. The lubricating oil of claim 1 which contains from 0.5 to 5% by weight N-bornylphenyl-alpha-naphthylamine.

References Cited by the Examiner
UNITED STATES PATENTS
2,009,480   7/1935   Craig.
3,019,191   1/1962   Furby et al. _____ 252—78

DANIEL E. WYMAN, *Primary Examiner.*